(12) United States Patent
Ghazal et al.

(10) Patent No.: US 9,720,966 B2
(45) Date of Patent: Aug. 1, 2017

(54) CARDINALITY ESTIMATION FOR OPTIMIZATION OF RECURSIVE OR ITERATIVE DATABASE QUERIES BY DATABASES

(71) Applicant: TERADATA US, INC., Dayton, OH (US)

(72) Inventors: Ahmad Said Ghazal, Redondo Beach, CA (US); Dawit Seid, Cary, NC (US)

(73) Assignee: Teradata US, Inc., Dayton, OH (US)

(*) Notice: Subject to any disclaimer, the term of this patent is extended or adjusted under 35 U.S.C. 154(b) by 0 days.

(21) Appl. No.: 13/721,901

(22) Filed: Dec. 20, 2012

(65) Prior Publication Data

US 2014/0181078 A1 Jun. 26, 2014

(51) Int. Cl.
 *G06F 17/30* (2006.01)
(52) U.S. Cl.
 CPC .............. *G06F 17/30463* (2013.01)
(58) Field of Classification Search
 CPC .................................. G06F 17/30466
 USPC ....................................... 707/718
 See application file for complete search history.

(56) References Cited

U.S. PATENT DOCUMENTS

| | | | |
|---|---|---|---|
| 5,367,675 A * | 11/1994 | Cheng et al. | |
| 5,752,241 A | 5/1998 | Cohen | |
| 6,138,111 A * | 10/2000 | Krishna | |
| 6,341,281 B1 * | 1/2002 | MacNicol et al. | |
| 7,805,411 B2 * | 9/2010 | Ziauddin et al. | 707/688 |
| 2004/0064441 A1 * | 4/2004 | Tow | 707/2 |
| 2006/0235818 A1 * | 10/2006 | Muras | G06F 17/30587 |
| 2007/0239691 A1 * | 10/2007 | Ordonez | G06F 17/30466 |
| 2009/0070313 A1 * | 3/2009 | Beyer et al. | 707/5 |

OTHER PUBLICATIONS

"Query Size Estimation by Adaptive Sampling", Journal of Computer and System Sciences, 51 (1), 18-25, 1995, by R.J Lipton.
"Size-Estimation Framework With Applications to Transitive Closure and Reachability", Journal of Computer and System Sciences, vol. 55, pp. 441-453, Dec. 1997 by Edith Cohen.

* cited by examiner

*Primary Examiner* — William Spieler
(74) *Attorney, Agent, or Firm* — Ramin Mahboubian (57) ABSTRACT

An execution plan for executing one or more iterations of recursive database queries can be generated in accordance with one aspect of the invention. For example, in accordance with one embodiment of the invention, one or more cardinalities (results or size of results, including intermediate results) associated with one or more iterations can be estimated. This estimation can, for example, by performed by using a sampling or sampling-based algorithm.
In addition, a plan generated for execution of one or more iteration of a recursive query can be modified or replaced by comparing the actual cardinality with its estimation. As a result, the first one or more iterations may be executed using a first plan but the subsequent one or more iterations may use a modified or different execution plan.

18 Claims, 9 Drawing Sheets

```
CREATE RECURSIVE VIEW all_trips (source, destination) AS SELECT dep_city,
arr_city FROM Flights
UNION ALL
SELECT   results_before.source,    next_leg.arr_city
FROM   all_trips results_before,    Flights next_leg
WHERE reults_before.destination=next_leg.dep_city;
```

FIG. 1

*Procedure ExecuteAllTrips*

*Begin*

1. *Retrieve from Flights table into Spool¹ 1 and Spool 2.*
2. *Join Flights with Spool 2.*
3. *If join result is empty go to step 7.*
4. *Empty Spool 2 and then set it to the join result.*
5. *Spool 1 = Spool 1 UNION join result .*
6. *Go to step 2.*
7. *Final result = Spool 1*
  *End*

CollectRCD

Input: Table name *base*, *TN1*, number of unique values in base *N*, *noOfSamples*
Output: Array storing per-iteration cardinality *IterationEstimates[]*;
1. *sampleClosure* = 0;
2. *noOfSamples* = 0;
3. while (*sampleClosure* >= $\Box$*N*)
4.    randomly choose a source s from *base*;
    //do breadth first search
   add s to *ReachableSet*;
5.    for *i* = 1 to *TN1*
6.       copy *ReachableSet* to *IterationReachableSet*;
7.       empty *ReachableSet*;
8.       for each row *i* in *IterationReachableSet*
9.          *ReachableSet* = neighbors of *r*; //can use index scan for this
10.          *IterationEstimates[i]* += |*ReachableSet*|;
11.          *sampleClosure* = *sampleClosure* + max (1, |*ReachableSet*|);
12.          increment *noOfSamples* by 1;
13.       endFor
14.    endFor
15.    empty IterationReachableSet
16. endWhile

GetComplexSeedEstimate
Input: Table name *base*, iteration *i*, seed part of the recursive query.
Output: The estimates of recursive query at i-th iteration
1. Read *IterationEstimates[i-1]* from database catalog.
2. Create a surrogate table correponding to the (i-1)th iteration seed, and fill in its cardinality and number of unique values based on *IterationEstimates[i-1]*.
3. Construct a query that represents the i-th iteration of the recursive query. Such query can be constructed by rewriting the recursive query by mapping the recursive reference with the surrogate table in step 2.
4. Use the optimizer to find size estimates of the query in step 3 and output the result.

CARDINALITY ESTIMATION FOR OPTIMIZATION OF RECURSIVE OR ITERATIVE DATABASE QUERIES BY DATABASES

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

As those skilled in the art readily appreciate, generally, optimization of database queries presents many challenges. In particular, optimization of iterative (or recursive) database queries (RQ's) poses more serious and difficult challenges, where a database query has to be computed as a series of iterations (or iterative operations) where the result of a first iteration is needed to compute the result of second iteration, and so on. It should be noted that queries requiring such iterative steps are also known, for example, as recursive queries in the context of the ANSI standard as generally known in the art.

In view of the foregoing, it should be noted that techniques for optimization of iterative queries (e.g., recursive queries of the ANSI standard) of database systems and environments are highly useful.

SUMMARY

Broadly speaking, the invention relates to computing environments and systems. More particularly, the invention relates to techniques for optimization of iterative or recursive database queries.

In accordance with one aspect of the invention, an execution plan for executing one or more iterations of recursive database queries can be generated. For example, in accordance with one embodiment of the invention, one or more cardinalities (results or size of results, including intermediate results or sizes) associated with one or more iterations can be estimated. This estimation can, for example, by performed by using a sampling or sampling-based technique or algorithm.

In accordance with another aspect of the invention, a plan generated for execution of one or more iteration of a recursive query can be modified or replaced by comparing the actual cardinality with its estimation. As a result, the first one or more iterations may be executed using a first plan but the subsequent one or more iterations may use a modified or different execution plan.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, techniques for optimization of iterative queries (e.g., recursive queries of the ANSI standard) of database systems and environments are highly useful. However, optimization of iterative queries poses even more difficult challenges partly because the result of an iteration (or sub-query) is dependent on a previous iteration (or previous sub-query) preceding it, but the same execution plans may not be optimal for executing both of the iterations (or sub-queries). In other words, different iterations may exhibit different cardinalities (results or result sizes, including intermediate results or sizes) and therefore require different optimal execution plans for executing each one of the iterations. However, conventionally, execution plans are determined statically, where an optimal plan is determined for the first iteration and followed for the proceeding iterations despite the suitability of the plan. In other words, cardinalities of the proceeding iterations are not considered in static query optimization techniques.

Figure 1:
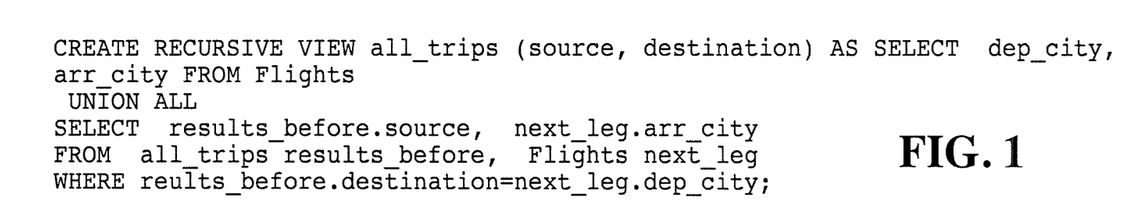
FIG. 1 depicts a very simplified example of an iterative query as a "Recursive View all-trips" designed to obtain all flights between source and destinations cities.

To further elaborate, FIG. 1 depicts a very simplified example of an iterative query as a "Recursive View all-trips" designed to obtain all flights between source and destinations cities. As this example shows, multiple iterative sub-queries are required in a table of flights with at least a source and destination entries between two cities with a direct flight, where the first source (e.g., San Diego) would give a first destination (e.g., Las Vegas) in a first iteration (or first sub-query), and wherein in a second iteration (or second sub-query) predicted on the first iteration, the first destination would become a second source (e.g., Las Vegas) to compute a second destination (e.g., Detroit), and so on. Although this simple example may not be fully illustrative, an ordinary person may better understand the problems associated with iterative database queries in noting that a second iteration may have significantly different characteristics as the number of outgoing flights from San Diego could widely differ from Las Vegas or New York, and so on.

Figure 2:
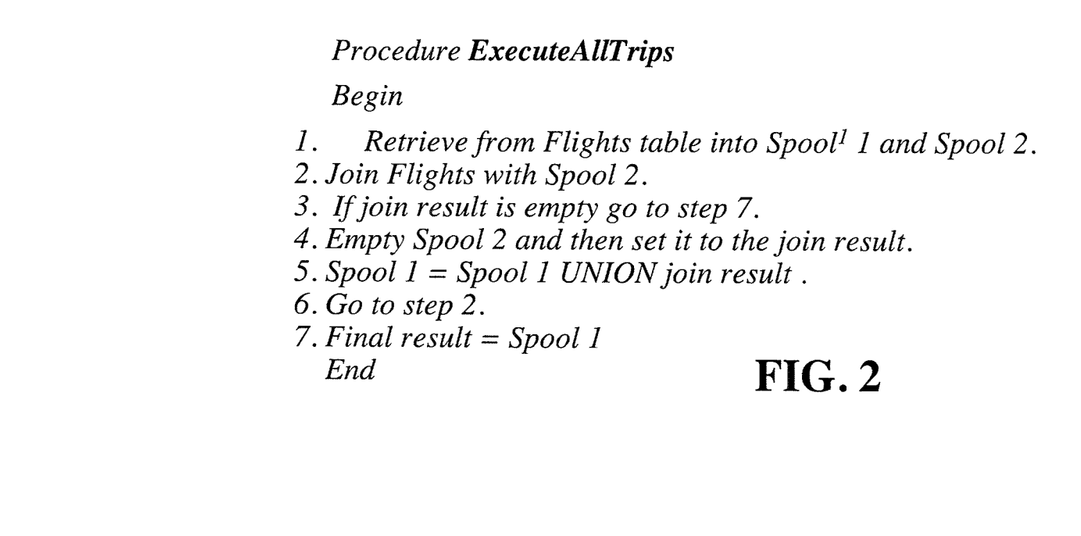
FIG. 2 depicts a very simplified procedure "ExecuteAll-Trips" to demonstrate a highly simplified implementation of executing the "Recursive View all-trips" shown in FIG. 1.

FIG. 2 depicts a very simplified procedure "ExecuteAll-Trips" to demonstrate a highly simplified implementation of executing the "Recursive View all-trips" shown in FIG. 1. Referring to FIG. 2, the steps 1-7 can, for example, be generated by an optimizer and executed by what may be called an "execution engine" as generally known in the art. The first step corresponds to performing a seed part (first SELECT). It can produce an initial result and feed it into the recursion or recursive steps 2-6. In the context, Spool 2 can be used to hold a "running seed" (or the recursive result of each iteration) which can then become part of a cumulative result held in spool 1. The final result can be represented as a "UNION" of the initial seed and the running seeds as those skilled in the art will readily appreciate.

In the example shown in FIG. 2, simply put, an optimizer would need to find the best way to perform the seed and recursive steps based on cost estimates. For example, in step 1, the optimizer may find an index access to the Flights stored in a Flights table. In step 1, the optimizer may also finds the best join method to join the Flights (or join the Flights table with itself) with Spool 2. Of course, for a practical application, and in particular for relatively more complex queries, the join plan for Step 2 can be very highly involved than the example shown in FIG. 2 would suggest.

Using the example of FIG. 2, it should be noted that conventionally a static plan in step 2 is determined based on the estimated cardinalities (i.e. cardinality statistics) of Spool 2 computed once and when the execution plan is first created. These statistics can basically be the outcome of the seed step (step 1) in the example shown in FIG. 2. Hence, the execution plan can be optimal for the first iteration of the recursive execution but may not be optimal for the subsequent iterations. One reason for this is that cardinality statistics of Spool 2 may change very significantly during the recursive execution rendering the initial plan non-optimal. For example, as the cardinality of Spool 2 changes from iteration i to iteration i+1, it is possible that "hash join" is determined to be the optimal way to join Flights to Spool 2 in i-th iteration but "merge join" could be the optimal way to do the join at the i+1th iteration.

In one approach, cardinality statistics can be collected and provided as feedback to address the inefficiency of the static planning schemes. In other words, after completion of an iteration of a recursive query, actual statistics can be taken and used in order to plan or re-plan the execution of the next iteration. This feedback process can be repeated at each iteration until all iterations of the recursive query have been completed in order to address the problem of static planning schemes where the same execution plan is used for all of the iterations. However, at least in some systems, including parallel systems (e.g., DBMS of a Teradata system) such full feedback solution may not be optimal as providing feedback at each iteration and re-planning can interrupt execution and the pipelining across iterations. Also, global query optimizations (for steps of different iterations), where common components of multiple execution plans are isolated and executed only once to avoid redundant repetition, may not be possible with a technique using feedback at each iteration (full feedback) given that the execution plans may not be known up-front In view of the foregoing, improved techniques for generating plans for execution of recursive database queries are needed and would be very useful.

Accordingly, it will be appreciated that an execution plan for executing one or more iterations of recursive database queries can be generated in accordance with one aspect of the invention. For example, in accordance with one embodiment of the invention, one or more cardinalities (results or size of results, including intermediate results) associated with one or more iterations can be estimated. This estimation can, for example, by performed by using a sampling or sampling-based algorithm.

In accordance with another aspect of the invention, a plan generated for execution of one or more iteration of a recursive query can be modified or replaced by comparing the actual cardinality with its estimation. As a result, the first one or more iterations may be executed using a first plan but the subsequent one or more iterations may use a modified or different execution plan.

Embodiments of these aspects of the invention are also discussed below with reference to FIGS. 3-7. However, those skilled in the art will readily appreciate that the detailed description given herein with respect to these figures is for explanatory purposes as the invention extends beyond these limited embodiments.

Figure 3:
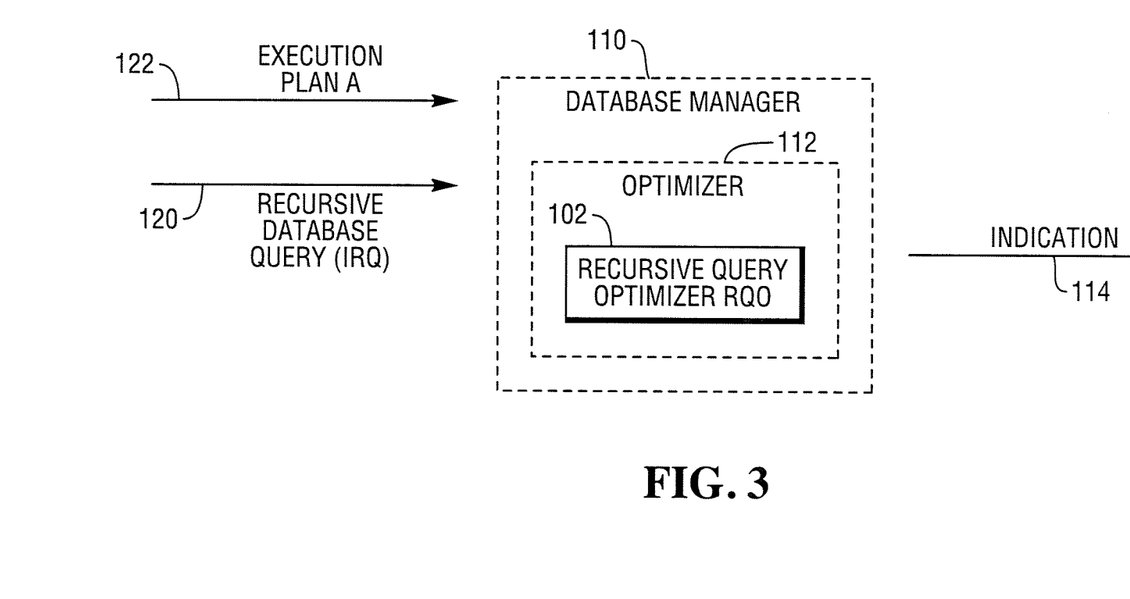
FIG. 3 depicts a database system that includes a Recursive Query Optimizer (RQO) in accordance with one embodiment of the invention.

FIG. 3 depicts a database system 100 that includes a Recursive Query Optimizer (RQO) 102 in accordance with one embodiment of the invention. As suggested by FIG. 3, the database system 100 may also include a database manager 110 (e.g., Database Management System (DBMS), a Relational Database Management System (RDBMS)) that effectively manages a database 101. As such, RQO 102 can, for example, be provided as a part of the database manager 110. More particularly, it will be appreciated that the RQO 102 can, for example, be provided as a part of an optimizer 112 in the database manager 110. Of course, the RQO 102 can be provided as a separate component. Furthermore, it is not necessary to use a database manager 110 and/or optimizer 112 as RQO 102 can be configured and can operate independently and separately as those skilled in the art will also readily appreciate.

Those skilled in the art will also readily appreciate that RQO 102 can be implemented at least partly as a computer executable program and/or as a hardware component. For example, RQO 102 can be provided as executable computer code stored in memory (not shown) and executed by one or more processors (not shown).

In any case, RQO 102 can generate execution plans for one or more recursive database queries 120 of the database system 100. Typically, a recursive database query 120 requires multiple sub-queries to be executed as multiple iterations such that a result of a first one of the sub-queries is needed to be determined in a first iteration of the iterations of the recursive database query 120 in order to determine the result of a second one of the sub-quires in a second iteration to be performed after the first iteration. In a process for generating execution plans for one or more recursive database queries 120 of the database system 100, RQO 102 can estimate at least one size of at least one result of execution for a first number of iterations of the iterations. By way of example, RQO 102 can estimate the size of one or more resulting tables for execution the first and second iterations of a recursive database query that may take several iterations to complete.

As will be discussed in greater detail below, the RQO 102 can, for example, use a sampling or sampling-based algorithm that estimates the size of the one or more resulting tables by sampling a subset of data of one or more data tables of the database associated with the database query. For example, in a case when one or more database tables are not joined to any other database tables during the iterations, a sampling or sampling-based algorithm can compute a size estimate for a pre-determined number of iterations (e.g., first three iterations) of a basic recursive query on the one or more database tables that are not joined to any other database tables during the iterations. In other words, cardinality estimates for one or more iterations can be determined and used to plan joins of one or more tables of the database associated with the recursive database query, as those skilled in the art will readily appreciate.

Furthermore, it will be appreciated that RQO 102 can use the estimated size of the execution of a number of iterations of the recursive query to generate a first execution plan for executing the iterations. In other words, the RQO 102 can estimate at least one size of at least one result of the execution of one or more iterations of the iterations required to execute a recursive query, and generate at least partly based on the at least one estimated size, a first execution plan for executing the one or more iterations of the recursive query.

Of course, RQO 102 can also be configured to execute or at least facilitate execution of a plan generated based on the estimated size of result or results of one or more iterations of a recursive database query. It should also be noted that the RQO 102 can also be configured to effectively compare an estimated size of a result with its actual size. The actual size can, for example, be determined by executing a plan generated for execution of a number of iterations. Based on this comparison, RQO 102 can, for example, change the execution plans for iterations that have not been executed yet.

Figure 4:
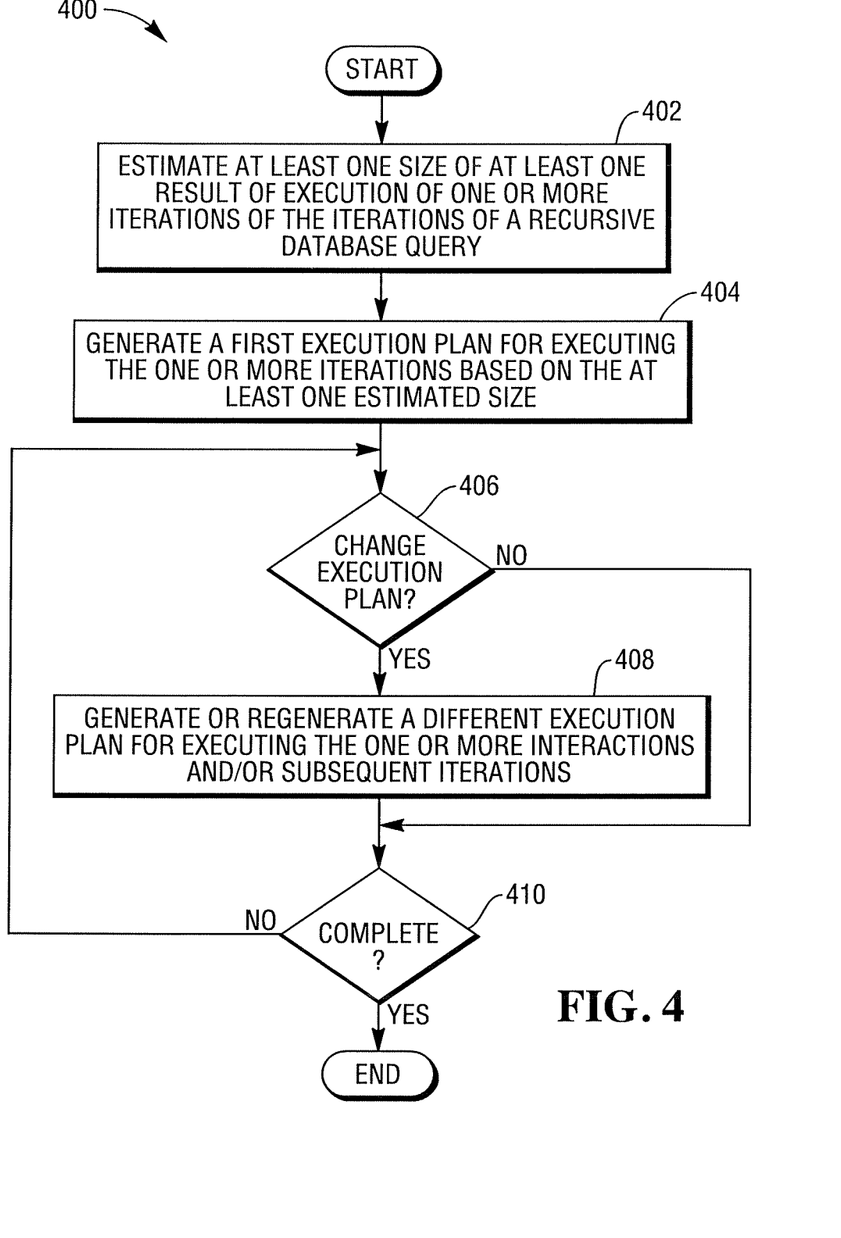
FIG. 4 depicts a method for generating an execution plan for a database query of a database in accordance with one embodiment of the invention.

To further elaborate, FIG. 4 depicts a method 400 for generating an execution plan for a database query of a database in accordance with one embodiment of the invention. Method can, for example, be used by a device and/or the Recursive Query Optimizer (RQO) 102. It should be noted the database query requires multiple sub-queries to be executed as multiple iterations such that a result of a first one of the sub-queries is needed to be determined in a first iteration of the iterations in order to determine the result of a second one of the sub-quires in a second iteration of the iterations to be performed after the first iteration.

Referring to FIG. 4, initially, at least one size of at least one result of execution of one or more iterations of the iterations of a recursive database query is estimated (402).

Thereafter, a first execution plan for executing the one or more iterations is generated (404) at least partly based on the at least one estimated size. Optionally, method 400 can determine (406) whether to change the plan, for example, by comparing the estimated size of a result for one or more iterations with actual value. Accordingly, method 400 can generate or regenerate (408) a different execution plan for the same iterations (which may have been executed) and/or subsequent iterations (which may not have been executed). This can, for example, by done by adjusting or modifying the size estimate for a sampling used to make the estimate or use alternative or different techniques or plans that may be available. On the hand, method 400 can proceed to use the same or similar execution plan until the execution of the recursive query has completed.

Generally, sampling can be used systematically to estimate the size of recursion across iterations of a recursive database query. In one approach, statistics can be collected on cardinalities associated with each iteration, for example, as part the general statistics collection phase of a database table (which could be repeated if the corresponding table changes significantly). In addition, a DBA can collect additional recursive-query specific statistics on the tables that are used as base tables in a recursive database query so that the RQO can exploit that statistics.

One category of recursive database queries where a sampling technique can be applied include recursive database queries where the recursive part includes only a self-join and a seed (or input) part does not contain other joins of the recursive table with another table (except in a semi-join like EXISTS, IN, NOT IN, etc.). Hence, in relatively more simple cases, the result of an iteration is not affected by joins with other tables. Essentially, the same or a similar technique can also be readily applied for joins between child and parent tables (Referential Integrity or RI joins) with minor extension.

Figure 5A:
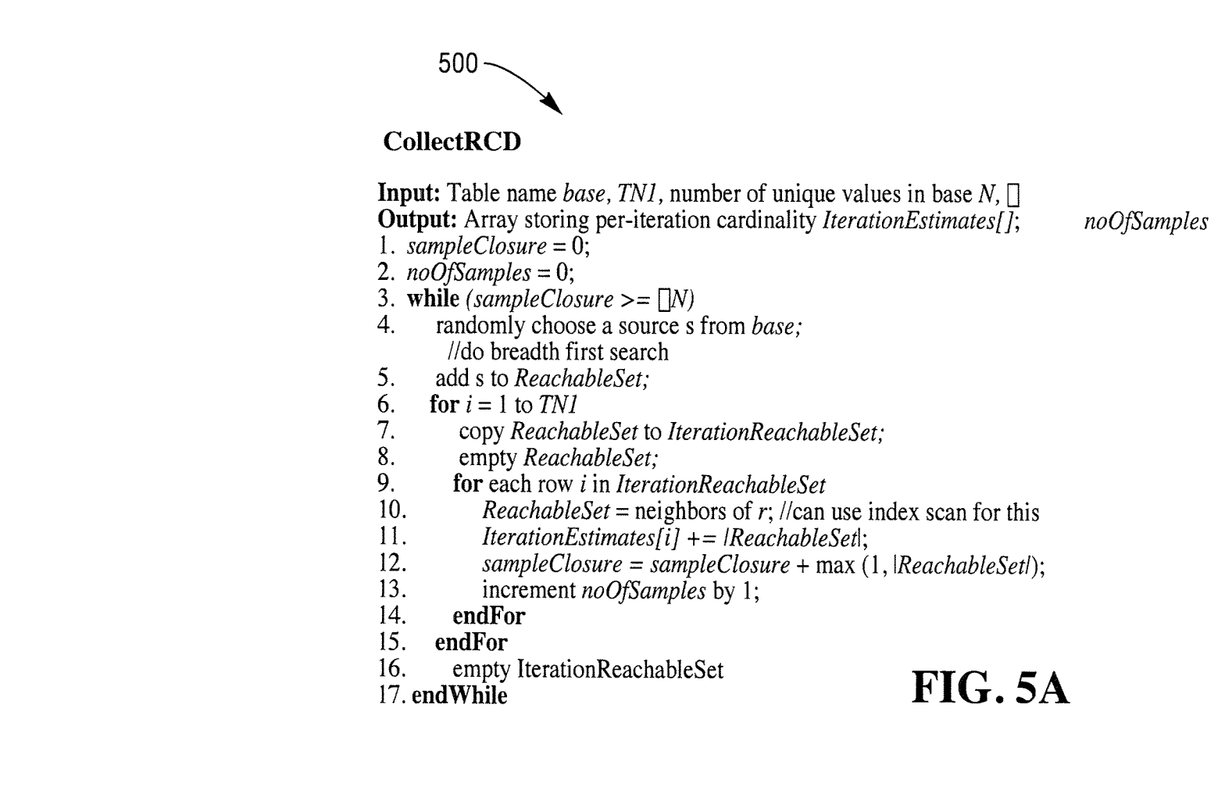
FIG. 5A depicts a method "CollectRCD" for an adaptive sampling in accordance with one embodiment of the invention.

To elaborate further, FIG. 5A depicts a method "CollectRCD" 500 for an adaptive sampling in accordance with one embodiment of the invention. Those skilled in the art will readily appreciate that method "CollectRCD" 500 can be similar to adaptive sampling based algorithms ("LN-algorithms") for estimating the cardinality of the complete transitive closure of a relation. A transitive closure estimate produced by an LN-algorithm can essentially be a cardinality estimate of a recursive query that uses the entire table as a seed. Hence, the global estimate found in this manner can be combined with selectivity estimates of a particular query's seed (produced by the optimizer) to estimate the recursive result cardinality of that query. However, instead of the transitive closure size, for join planning, cardinality estimates at each iteration are needed for method "CollectRCD" 500 and can be obtained by capturing per-iteration estimates as part of an LN-algorithms shown in FIG. 5.

Referring to FIG. 5A, In CollectRCD, N is the number of unique values of source, $\alpha$ is a function of the confidence interval within which we wish to estimate the size of the transitive closure, where $\alpha$ is set to did $d(d+1)/(1-\sqrt{p})$, where $0 \leq p < 1$ is the confidence and $d > 0$ is a fixed value. Note that depending on availability of histograms on the source field, the random sampling can also be directed by the distribution in the histogram to get more representative samples. TNI is the total number of iterations which can be computed by other sources including other form of sampling. It also can be set to N as an upper bound assuming acyclic graphs.

Figure 5B:
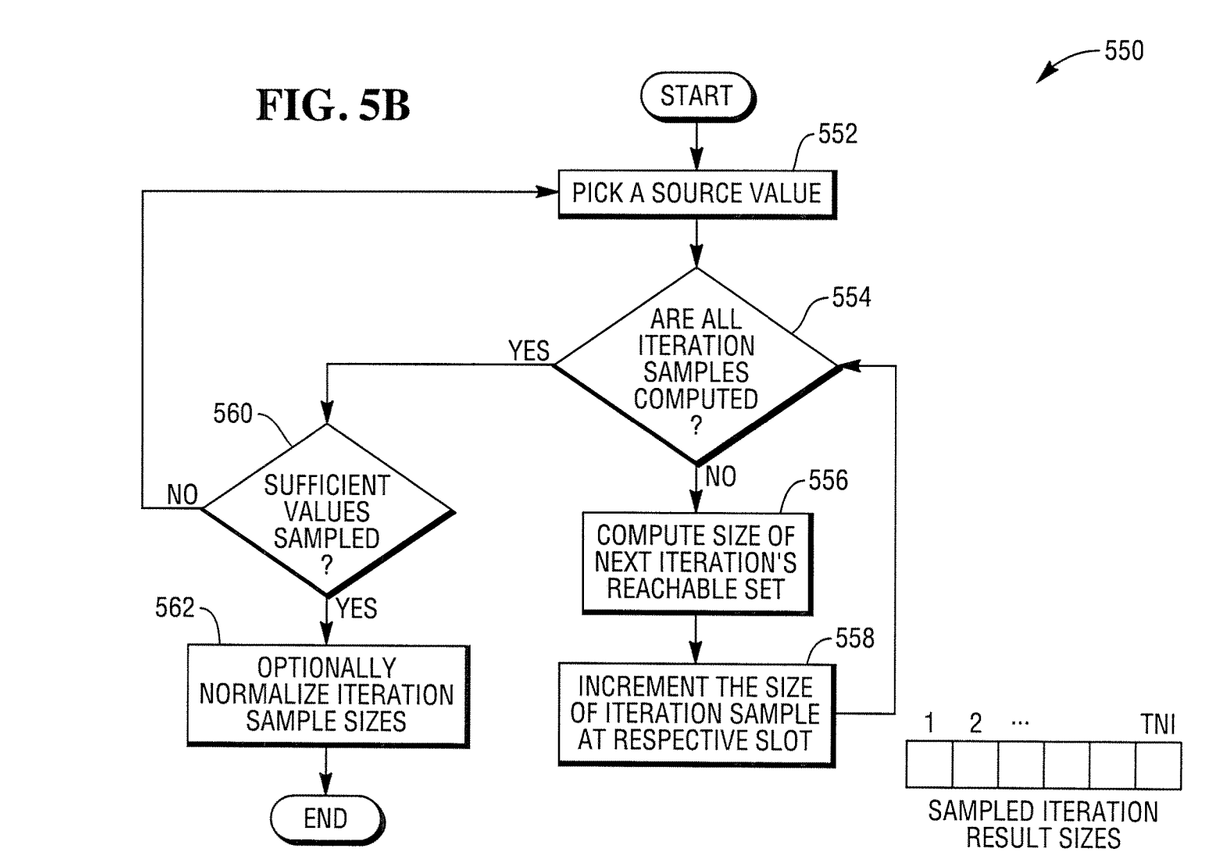
FIG. 5B depicts a method for adaptive sampling in accordance with another embodiment of the invention.

To elaborate further, FIG. 5B depicts a method 550 for adaptive sampling in accordance with another embodiment of the invention. Referring to FIG. 5A, initially, a source (or input) value is randomly selected (552). Next, it is determined (554) whether iteration samples have been computed. Accordingly, size of the next iteration can be computed (556) and the size of iteration sample can be incremented (558) at its respective slot, if it is determined (554) that not all the iteration samples have been computed. Method 550 can proceed in a similar manner to randomly pick (552) a source value and compute (554) size of iterations until it is determined (560) that a sufficient sample size has been reached, for example, by determining whether a sufficient fraction of unique values have been reached. If it is determined (560) that sample size is sufficient, the method 550 can optionally normalize (562) iteration sample sizes before it ends.

For database recursive queries where the recursive part includes only a self-join and the seed part does not contain any other join, the iteration cardinalities collected by the method CollectRCD 500 (shown in FIG. 5A) can be sufficient to generate "lookahead" plan(s) where adaptive recursive query planning techniques can generate plans for the different iterations upfront.

Figure 5C:
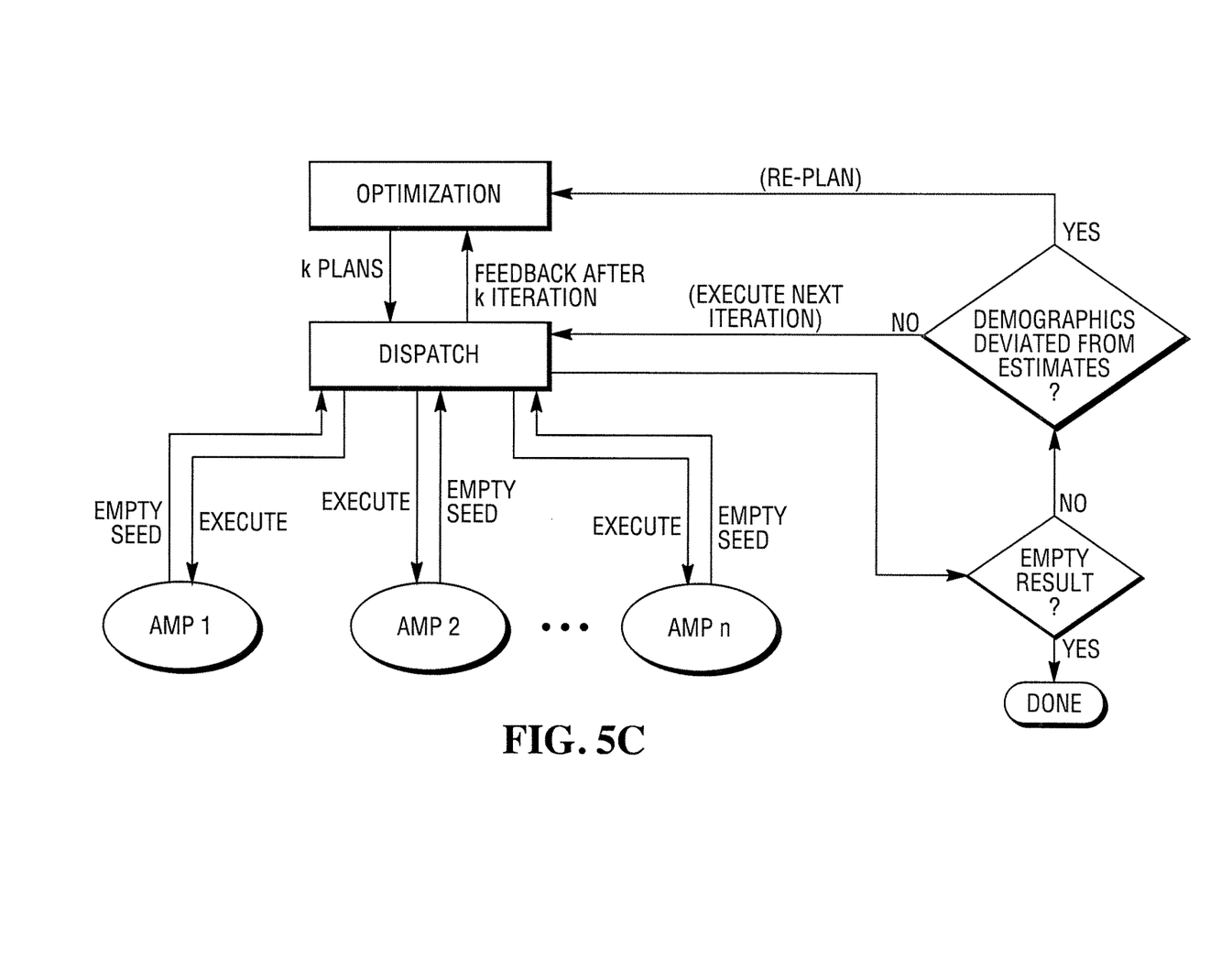
FIG. 5C depicts a multiprocessing database where an optimizer can produce plans for multiple recursive iterations up-front instead of just one plan for the first iteration in accordance with one embodiment of the invention.

As shown in FIG. 5C, in a multiprocessing database, an optimizer can produce plans for multiple recursive iterations up-front instead of just one plan for the first iteration in accordance with one embodiment of the invention. The resulting plans can be sent by a dispatcher to processing units (or data-parallel execution units shown as AMPs, for example of the Teradata MPP DBMS. The processing units can either send back feedback after k iterations or an empty seed if the recursion has finished at that AMP. The RQ finishes when all AMPs return an empty seed. In addition to generating better plans, this approach allows the optimizer to consider both pipelining and global query optimizations by making the k plans available. The above approach can requires projected estimates of demographics at the different iterations to produce the appropriate plan at each iteration of a recursive database query.

Based on the sampling-based estimates of results of iterations(s), multiple "lookahead" plans can be generated for multiple iterations of a recursive query thereby avoiding the limitations of both static plans and full feedback planning.

As shown in FIG. 5C, in a multiprocessing database, an optimizer can produce plans for multiple recursive iterations up-front instead of just one plan for the first iteration in accordance with one embodiment of the invention. The resulting plans can be sent by a dispatcher to processing units (or data-parallel execution units) shown as AMPs, for example of the Teradata MPP DBMS. The processing units can either send back feedback after a pre-configured k iterations or an empty seed if the recursion has finished at that AMP. The RQ finishes when all AMPs return an empty seed. In addition to generating better plans, this approach allows the optimizer to consider both pipelining and global query optimizations by making the k plans available. The above approach can requires projected estimates of cardinality statistics at the different iterations to produce the appropriate plan at each iteration of a recursive database query.

As noted above, for queries where the recursive part includes only a self-join and the seed part does not contain any other join, the iteration cardinalities collected by the method CollectRCD 500 (shown in FIG. 5A) can be used to generate lookahead plans. However, it should be noted that when a recursive query includes joins of recursive results with other tables, in addition to the self-join, the result of each iteration can be also affected by the joins with the other tables and the impact of these joins can be considered. In queries where the recursive table is joined with another table in the seed part, the size of the seed may grow to be larger than the recursive table itself and the distribution of values of source (input) and/or sink (output) fields may be significantly or completely different from the recursive table.

A first class of joins are RI (Referential Integrity) joins which can be readily handled by using the iteration cardinalities from the method "CollectRCD" 500 in combination with the RI constraint which is guaranteed to cap the size of the seed at all iterations.

Figure 6A:
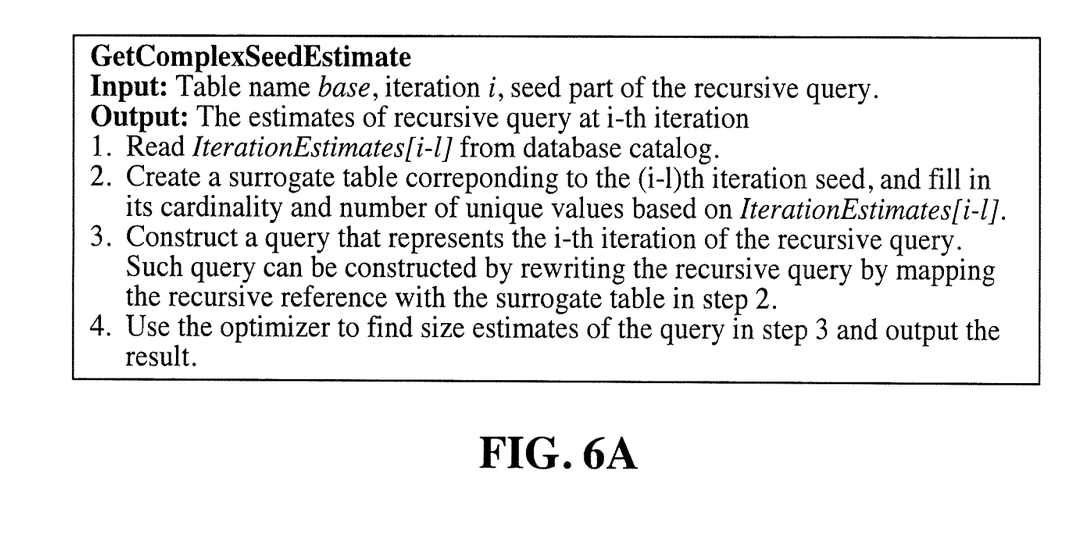
FIG. 6A can be used in the accordance with one embodiment of the invention.

However, for non-RI joins, a method "GetComplexSeedEstimate" 600 depicted in FIG. 6A can be used in the accordance with one embodiment of the invention. The GetComplexSeedEstimate" 600 effectively combines the iteration cardinalities from CollectRCD with the cardinality statistics of the joined tables in the seed part of a database recursive query (RQ). It should be noted that the method "GetComplexSeedEstimate" 600 can, for example, utilize a conventional query optimizer for the generation of a lookahead plan at a particular iteration i. As such, it can leverage sampling based cardinalities collected during a separate Collect-Statistics phase for a runtime estimation of seed sizes at different iteration of a recursive query evaluation as those skilled in the art will readily appreciate. It should also be noted that Cardinality and unique values can both be captured by the method "GetComplexSeedEstimate" 600.

Figure 6B:
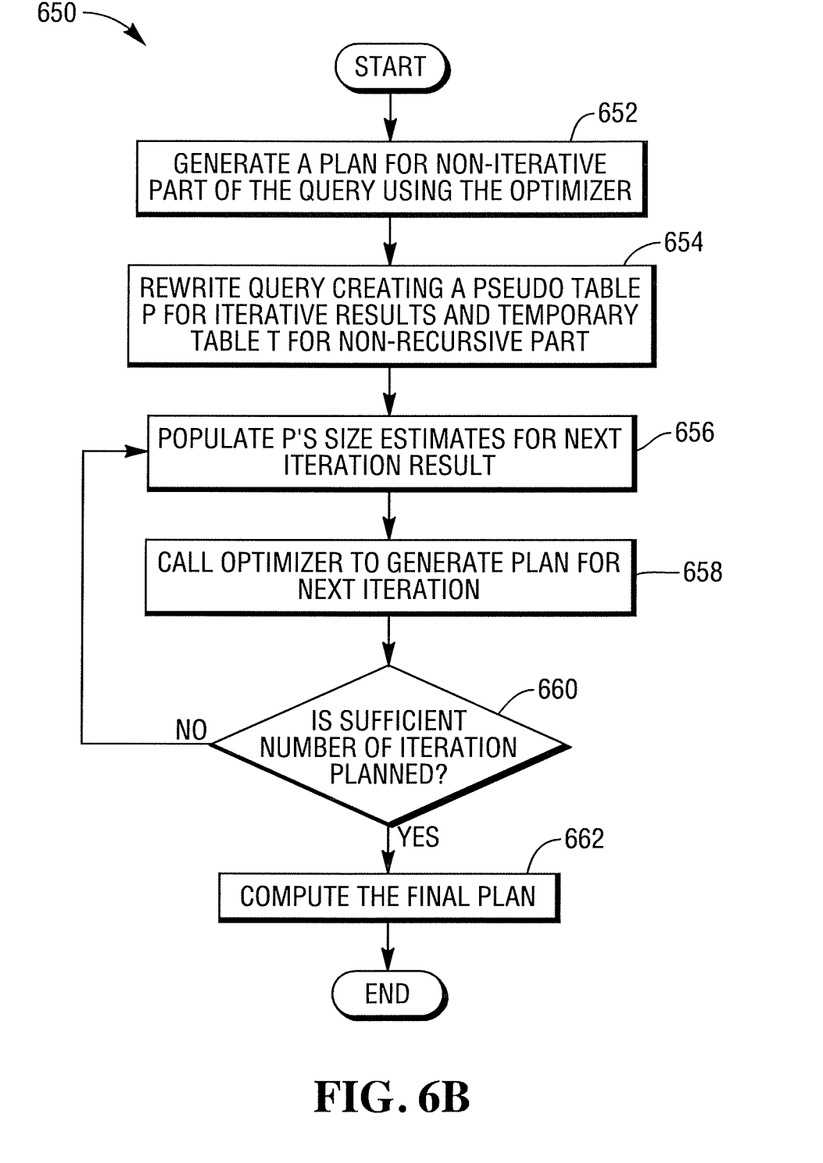
FIG. 6B depicts a method for generating a plan for relatively more complex recursive queries (e.g., non-RI joins) in accordance with one embodiment invention.

To elaborate even further, FIG. 6B depicts a method 650 for generating a plan for relatively more complex recursive queries (e.g., non-RI joins) in accordance with one embodiment invention. Initially, a plan can be generated (652) for a non-iterative part of the recursive query, for example, by using an optimizer. As such, iterative and non-iterative parts may be effectively separated. Next, the recursive query can be effectively rewritten (654) by creating a pseudo table P for iterative results and temporary table T for a non-recursive part of the recursive query. Thereafter, for the pseudo table P for iterative results, the size estimates for the result of the next one or more iteration s can be populated (656) and a plan for execution of the one or more iterations can be generated, for example, by calling the optimizer. The method 650 can proceed in a similar manner to populate (656) the size estimates for the result of the next one or more iteration and generate (658) a plan for execution of the one or more iterations until it is determined (660) that a sufficient number of iterations have been computed and a final plan is computed (662) before the method 650 ends.

It should be noted that techniques noted above are especially useful for large database systems, including single or multi-node, parallel database systems. A multi-node parallel database system can, for example, use a massively parallel processing (MPP) architecture or system to perform various database operations in parallel.

Figure 7:
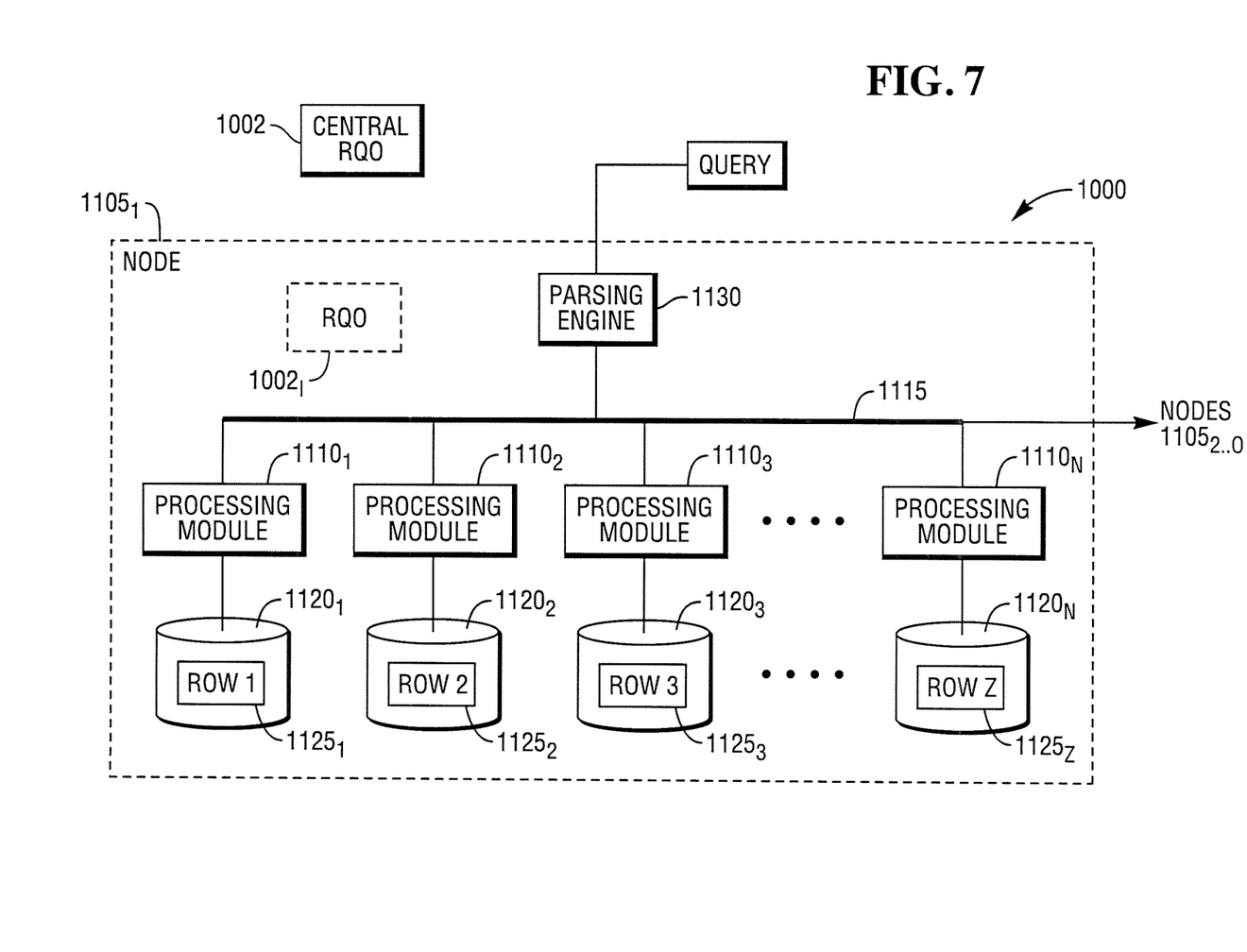
FIG. 7 depicts a database node of a database system or a Database Management System (DBMS) in accordance with one embodiment of the invention

To further elaborate, FIG. 7 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 7 depicts in greater detail an exemplary architecture for one database node $1105_1$ of the DBMS 1000 in accordance with one embodiment of the invention.

Referring to FIG. 7, the DBMS node $1105_1$ includes multiple processing units (or processing modules) 1110-N connected by a network 1115, that manage the storage and retrieval of data in data-storage facilities $1120_{1-N}$. Each of the processing units 1110-N can represent one or more physical processors or virtual processors, with one or more virtual processors (e.g., an Access Module Processor (AMP)) running on one or more physical processors in a Teradata Active Data Warehousing System). For example, when provided as AMPs, each AMP can receive work steps from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work steps that can be sent to be executed by the processing units $1110_{1-N}$.

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 7, it should be noted that a Recursive Query Optimizer (RQO) 1002 can be provided for the database node $1105_1$. The RQO 1002 can be act as a central component. However, it should be noted that each one of the processing units $1110_{1-N}$ can be effectively provided with a local Optimizer (RQO) $1002_{1-N}$ that can serve as a local component and possibly collaborate with the RQO 1002. Of course, various other configurations are possible and will become readily apparent in view of the foregoing.

Techniques for optimization of recursive or iterative database queries are also described in patent application Ser. No. 13/722,068 entitled "ADAPTIVE OPTIMIZATION OF ITERATIVE OR RECURSIVE QUERY EXECUTION BY DATABASES," which is hereby incorporated by reference herein in its entirety and for all purposes.

Techniques for optimization of recursive or iterative database queries are also described in patent application Ser. No. 13/722,133 entitled "ESTIMATING NUMBER OF ITERATIONS OR SELF JOINS REQUIRED TO EVALUATE ITERATIVE OR RECURSIVE DATABASE QUERIES," which is hereby incorporated by reference herein in its entirety and for all purposes.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by a device, for generating an execution plan for a database query of a database, wherein the database query requires multiple sub-queries to be executed as multiple iterations such that a result of a first one of the sub-queries is needed to be determined in a first iteration of the iterations in order to determine the result of a second one of the sub-queries in a second iteration of the iterations to be performed after the first iteration, and wherein the method comprises:

estimating at least one result associated with execution of multiple iterations of the iterations at least partly based on a sampling or sampling-based technique by at least iteratively computing one or more join values, wherein the estimating of the at least one result of execution of the multiple iterations of the iterations comprises:

using a sampling or sampling-based technique that estimates the at least one size of at least one result by sampling a subset of data of one or more database tables of the database associated with the database query; and wherein the using of the sampling technique comprises:

selecting a starting value from the one or more database tables as a sample of the sampling technique; and iteratively computing all joining values of the starting value from the one or more database tables while storing the size of a first result at each iteration of the first number of iterations in a respective slot; and generating at least partly based on the at least one estimated result of the multiple iterations, a first execution plan for executing the multiple iterations.

2. The method of claim 1, wherein the using of the sampling technique comprises: computing a size estimate for a pre-determined number of iterations of the iterations on one or more database tables of the database involved in the database query, wherein the one or more database tables are not joined to any other tables of the database during the pre-determined number of the iterations.

3. The method of claim 1, wherein the using of the sampling technique comprises: determining cardinality estimates for the multiple iterations; planning joins of one or more database tables of the database involved in the database query.

4. The method of claim 1, wherein the using of the sampling technique further comprises: selecting another starting value; iteratively computing all its joining values while accumulating the size of the result at each iteration to the respective slot.

5. The method of claim 4, wherein the using of the sampling technique further comprises: repeating the selection of the starting value and iteratively computing of all of its joining values until it is determined that a sufficient number of values have been sampled.

6. The method of claim 5, wherein the determining of whether a sufficient number of values have been sampled comprises: determining whether a determined ratio of total number of unique values in the one more database tables have been selected.

7. The method of claim 1, wherein the using of the sampling technique further comprises: incorporating the iteration cardinalities with other estimates for use by a database system's query optimizer to compute the iteration sizes of any multi-iteration query.

8. The method of claim 1, wherein the using of the sampling technique further comprises: generating an execution plan for a non-iterative part of the database query; generating at least one pseudo table for iterative results of the database query and at least one temporary table for the non-recursive part; and populating the size estimates of the at least one pseudo table for the iterative results.

9. The method of claim 1, wherein the method further comprises: comparing the actual result of execution of the multiple iterations with the estimated result; generating a second plan for executing the one or more other remaining iterations of the database query at least based on the comparing of the actual and estimated results.

10. A device that includes one or more processors that are configured to: estimate at least one result associated with execution of one or more iterations of the iterations of a database query of a database, wherein the database query requires multiple sub-queries to be executed as multiple iterations such that a result of a first one of the sub-queries is needed to be determined in a first iteration of the iterations in order to determine the result of a second one of the sub-queries in a second iteration of the iterations to be performed after the first iteration, and generate at least partly based on the at least one estimated result, a first execution plan for executing the one or more iterations.

11. The device of claim 10, wherein the estimating of the at least one result of execution of the one or more iterations of the iterations comprises: using a sampling or sampling-based technique that estimates the at least one size of at least one result by sampling a subset of data of one or more database tables of the database associated with the database query.

12. The device of claim 11, wherein the using of the sampling technique comprises: computing a size estimate for a pre-determined number of iterations of the iterations on one or more database tables of the database involved in the database query, wherein the one or more database tables are not joined to any other tables of the database during the pre-determined number of the iterations.

13. The device of claim 11, wherein the using of the sampling technique comprises: determining cardinality estimates for the one or more iterations; planning joins of one or more database tables of the database involved in the database query.

14. A non-transitory computer readable storage medium that stores at least executable code for generating an execution plan for a database query of a database, wherein the database query requires multiple sub-queries to be executed as multiple iterations such that a result of a first one of the sub-queries is needed to be determined in a first iteration of the iterations in order to determine the result of a second one of the sub-queries in a second iteration of the iterations to be performed after the first iteration, and wherein the executable code includes: executable code for estimating at least one result associated with execution of one or more iterations of the iterations; and executable code for generating at least partly based on the at least one estimated result, a first execution plan for executing the one or more iterations.

15. The non-transitory computer readable storage medium of claim 14, wherein the estimating of the at least one result of execution of the one or more iterations of the iterations comprises: using a sampling or sampling-based technique that estimates the at least one size of at least one result by sampling a subset of data of one or more database tables of the database associated with the database query.

16. The non-transitory computer readable storage medium of claim 15, wherein the using of the sampling technique comprises: computing a size estimate for a pre-determined number of iterations of the iterations on one or more database tables of the database involved in the database query, wherein the one or more database tables are not joined to any other tables of the database during the pre-determined number of the iterations.

17. The non-transitory computer readable storage medium of claim 15, wherein the using of the sampling technique comprises: determining cardinality estimates for the one or more iterations; planning joins of one or more database tables of the database involved in the database query.

18. The non-transitory computer readable storage medium of claim 15, wherein the using of the sampling technique comprises: selecting a starting value from the one or more database tables; and iteratively computing all its joining values while storing the size of a first result at each iteration of the first number of iterations in a respective slot.

* * * * *